April 2, 1957     E. FRISELL     2,787,485
AUTOMATIC GRIP MEANS BETWEEN TELESCOPED MEMBERS
Filed May 12, 1952     2 Sheets-Sheet 1
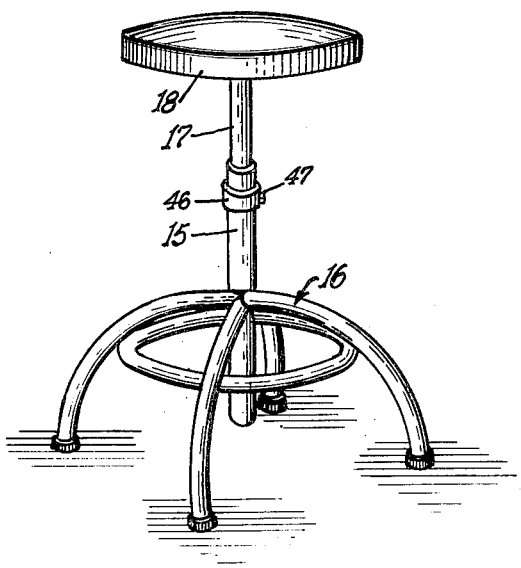
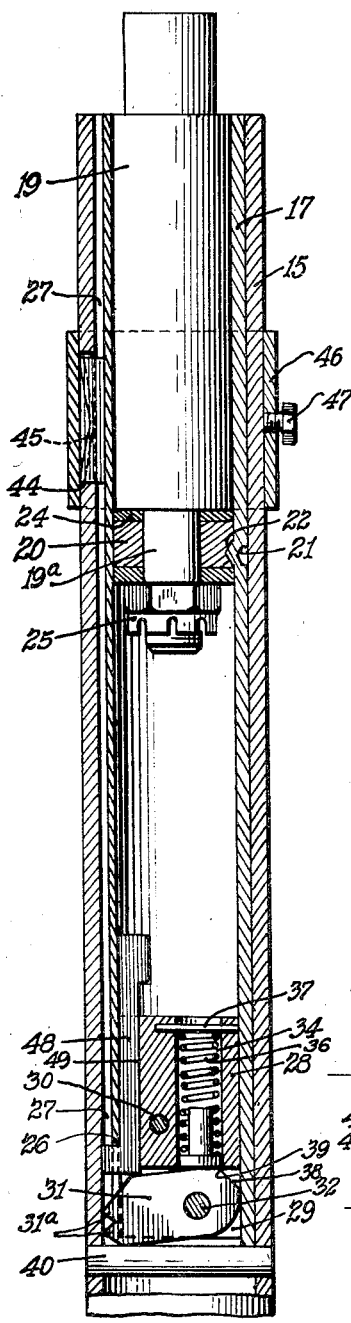
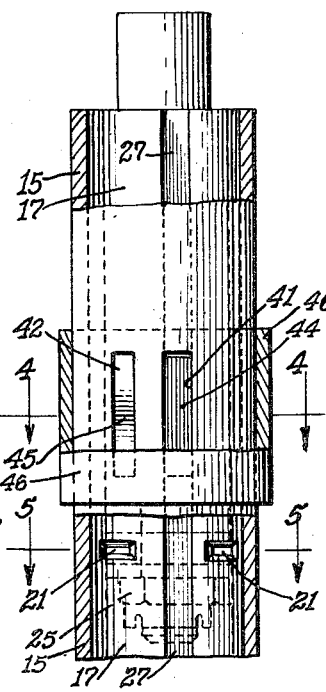
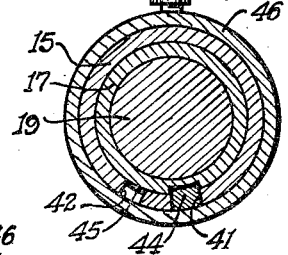
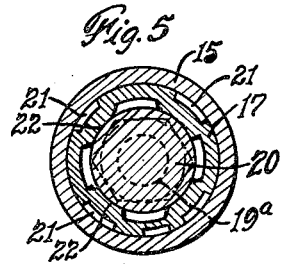
INVENTOR
Ernest Frisell
By Frank Schraeder
Attorney April 2, 1957  E. FRISELL  2,787,485
AUTOMATIC GRIP MEANS BETWEEN TELESCOPED MEMBERS
Filed May 12, 1952  2 Sheets-Sheet 2
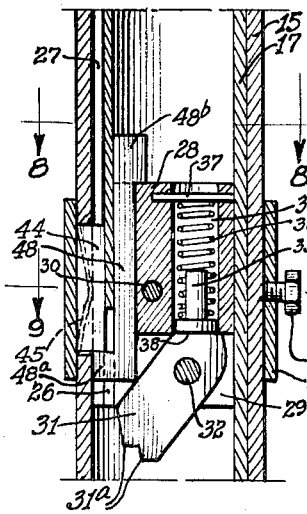
Fig. 6
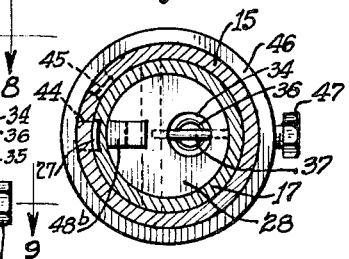
Fig. 8
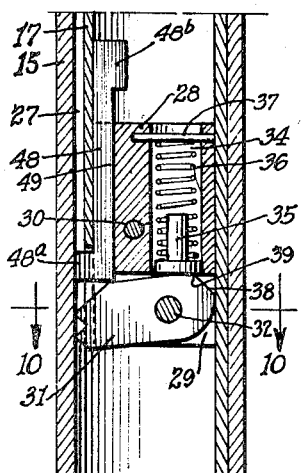
Fig. 7
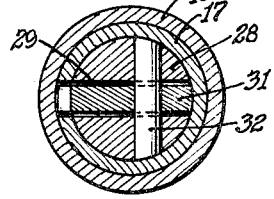
Fig. 10
Fig. 9
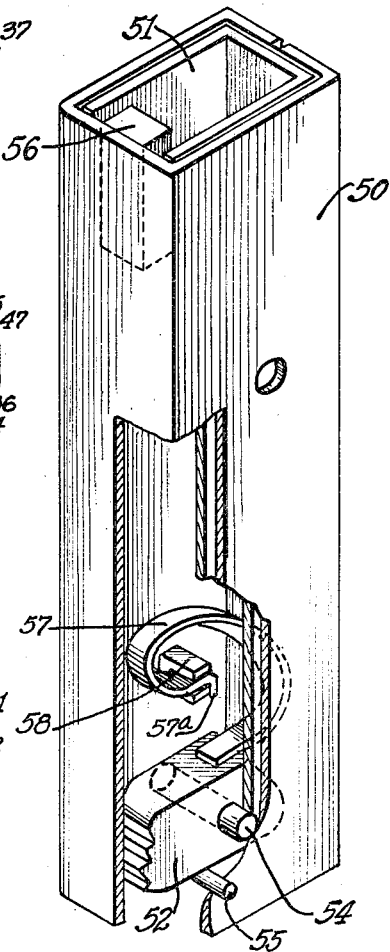
Fig. 11
INVENTOR
Ernest Frisell
By Frank J. Schraeder Jr.
Attorney United States Patent Office 2,787,485
Patented Apr. 2, 1957

2,787,485

AUTOMATIC GRIP MEANS BETWEEN TELESCOPED MEMBERS

Ernest Frisell, Omaha, Nebr.

Application May 12, 1952, Serial No. 287,443

11 Claims. (Cl. 287—58)

The present invention relates to an extensible post, strut or the like composed of an outer tubular member and an element slidable within the same and protruding from one end thereof.

The object of the invention is to provide within the aforesaid structure a simple and novel automatic means to prevent contraction during use, while permitting any desired adjustment to be effected through proper lengthwise shifting of the two telescoped members relatively to each other.

In carrying out my invention, I employ a retainer in the form of a pivoted, spring-pressed dog having one or more teeth on the free end to bite into or wedge against the outer tube for holding or locking the two telescoped members against relative lengthwise movements in one direction.

Such a retainer is used in an exposed position in Patent 2,415,663 in the seat-supporting framework of a stool; and, therefore, my invention may be regarded in one of its aspects as having for an object to provide improved means for using that retainer in a simple and effective way within the limited space inside of a fairly small tube, where it is concealed and protected against tampering and from contact with external things which might damage it.

This latter object is accomplished by mounting the retainer on the inner end of the inner of the two telescoped members and providing stationary abutments within the outer member to trip the retainer from one position to another at the ends of the allowable lengthwise movements between such members.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a perspective view of a stool having a seat mounted on top of an adjustable column embodying the present invention; Fig. 2 is an axial section, on a much larger scale, through said column, with the inner member lowered and the dog or retainer in its idle position; Fig. 3 is a view, partly in section and partly in elevation, of the upper part of said column; Figs. 4 and 5 are sections taken, respectively, on lines 4—4 and 5—5 of Fig. 3; Fig. 6 is a section on the same plane as Fig. 2, showing the upper end of the outer tubular member, with the inner member raised and the dog or retainer in its idle position; Fig. 7 is a section on the same plane as Figs. 2 and 6 showing a fragment of the column, with the dog or retainer in its working position; Figs. 8 and 9 are sections of Fig. 6 on lines 8—8 and 9—9, respectively; Fig. 10 is a section on line 10—10 of Fig. 7; and Fig. 11 is a perspective view, partly broken away, showing a modification wherein a lengthwise adjustable member is rectangular in cross section.

In the drawings the invention is illustrated as applied to a column or post used in a stool provided with a seat that may be raised and lowered; and, for the sake of brevity, the detailed description will be confined to this exemplification, although the lengthwise adjustable member is adapted for use in other fields.

Referring to the drawings, 15 is a tubular member fixed to and rising from a base 16. Telescoped within and projecting upwardly from member 15 is a second member, shown as taking the form of a tube 17 on the upper end of which is a seat 18. The seat is actually carried on a solid cylindrical part 19, rotatable in tube 17 but held against relative axial movement.

In the arrangement shown, there is in the upper part of tube 17 a plug 20, held in place by swaging the wall of the tube to create lugs 21 that enter depressions 22 in the periphery of the plug. On top of the plug is an antifriction disc 24. Part 19 rests on disc 24 and has a stem 19ª, of reduced diameter, extending through the disc and the plug. A nut 25 on part 19ª completes the assembly.

At its lower end tube 17 has a short longitudinal slot 26. Aligned with this slot is a longitudinally disposed peripheral groove 27 extending to the upper end of the tube. Within the lower end of tube 17 is a long cylindrical block 28. A diametrical slot 29 extends deeply into the block through the bottom face. The block 28 is secured to the tube by a pin 30 that extends crosswise through the wall of the tube and through the block, with the slot in the block registering with slot 26 in the tube.

Practically filling slot 29 and protruding at one end through slot 26 is a dog or retainer 31 held in place for swinging movements, up and down, by a pivot pin 32; the pivot being near one end of the retainer, which may be termed the inner end or heel. On the outer end of the retainer are two teeth 31ª, both of which engage with the inner surface of outer tube 15 when the retainer is in its up or working position as shown in Figs. 2 and 7; both teeth at this time lying a little below a horizontal plane containing the axis of pin 32.

In block 28 is a vertical bore 34 the axis of which is a little on the heel side of the retainer with respect to the axis of pivot pin 32. In this bore is a headed plunger or follower 35, slidable in the bore and resting on the upper edge of the retainer. In the bore, above the follower, is a coil spring 36 held in place by an overlying pin 37 that extends crosswise of the block and intersects bore 17. The spring is under initial compression. The upper edge of the retainer may be straight, except at the heel where the upper corner is cut away to create a downwardly inclined surface 38; the juncture of this surface with the remainder of the upper edge forming an apex or corner 39 which also lies on the heelward side of the axis of pivot pin 32.

When the retainer has been swung down into its idle position, as in Fig. 6, follower 35 rests on the flat surface 38 and yieldingly locks the retainer in this position. When the retainer is swung up until stopped by engagement with the outer tube, as in Figs. 2 and 7, the follower contacts the retainer only at corner 39; so that nothing restrains the retainer against swinging up a little farther except the outer tube.

As best shown in Fig. 2, there is a sturdy pin 40 fixed to and extending across the interior of the outer tube. When the inner tubular member is lowered, the toothed working end of the retainer strikes this pin.

Toward the upper end of outer tube 15, are two vertically elongated, narrow windows, 41 and 42, near each other. Set loosely in window 41 is an abutment in the form of a bar 44, rectangular in cross section; while window 42 contains a loose, bowed leaf spring 45. A sleeve 46, long enough to cover both windows, is slidably mounted on the outer tube and is normally held in its window-closing position by a set screw 47. The thickness of the bar 44 is greater than the wall thickness of the outer tube. Therefore, when the assembly of the various parts is made, with the longitudinally disposed groove 27 in the periphery of the inner tube in registration with window 41, the bar 44 must project into that groove and serve as a key to prevent relative rotation between the tubes. The leaf spring is bowed to such an extent initially that it must be flattened a little to be accommodated in the space between the periphery of the inner tube and the inner surface of sleeve 46. Consequently, the spring acts as a yieldable brake shoe to hold the inner tube lightly in any position into which it may be brought.

The primary purpose of abutment bar 44 is to trip the retainer when the stool seat is raised to the upper limit of its movements. In the arrangement shown, instead of having the retainer strike directly against the upper abutment, I interpose between that abutment and the retainer a loose pusher bar 48. In the arrangement shown, the body portion of the pusher bar lies in a peripheral groove 49 extending longitudinally from slot 29 in block 28 to the upper end of that block, wholly within the inner tubular member. On the lower end of the body portion of the pusher bar is a lateral projection 48a that reaches to the inner surface of the outer tube. At the upper end of the bar is a lateral projection 48b directed inwardly toward the axis of the column, so as to overlie the top of the block. The parts are so proportioned that the pusher may slide down relative to the block, but only until projection 48b engages with the top of the block as in Fig. 6. By this time the retainer has been forced down and snapped past center into its release position, and is no longer subject to pressure by the pusher.

When the seat is raised, it is the lower projection 48a on the pusher bar which engages abutment bar 44 as it is the only part of the pusher bar that projects out past the plane of the bottom of groove 27 in the inner tube into which bar 44 extends.

In the use of the stool, whenever the seat is in any intermediate position as, for example, in Fig. 7, it is locked against downward movement by the retainer. If it be desired to lower the seat, it must first be raised until the retainer is tripped as shown in Fig. 6 by abutment 44. Follower 35 and spring 36 hold the retainer in this, the idle position. The seat may then be pushed down, against the slight resistance of the braking spring, until the retainer meets lower abutment 40, whereupon the retainer is forced back into its working position, as shown in Fig. 2. The seat may then be raised to any desired height from which it cannot again be lowered until it is first raised to the upper limit.

The two telescoped relatively movable members need not be circular in cross section. Thus the outer tube may have a polygonal shape as shown in Fig. 11.

In Fig. 11 the outer tube 50 is of rectangular section. The cross section of the inner tube 51 is that of a smaller rectangle with one side omitted, namely a channel shape. The retainer 52 which is similar in design to retainer 31 is supported in the lower end of the inner member 51 on a horizontal pivot pin 54, in a manner to allow it to engage the wall of the outer tube exposed at the open side of the inner tube. Lower abutment pin 55, corresponding to pin 40 in the first form, is located in the outer tube below the retainer. The upper abutment 56 is welded or otherwise fixed to the inner side of the outer tube in position to project into the inner tube through the open side of the latter. A leaf spring 57 in the form of a little more than one turn of a spiral overlies the retainer, one end resting on top of the retainer while the other extends through a jaw 58 fixed to a wall of the inner tube; the latter end of the spring having a downturned lip 57a to prevent it from slipping out of the jaw.

It will thus be seen that in both forms of the invention the retainer dog is wholly concealed. Furthermore, in the main form of the device the parts may easily be assembled and disassembled, greatly facilitating manufacture and the making of replacements and repairs.

I claim:

1. An extensible device comprising a tubular member, a second member fitting slidably in and protruding at one end from the tubular member, a retainer pivoted within the inner end of said second member for swinging movements between a working position and an idle position, a pusher movable on said second member to shift the retainer into its idle position, said retainer in its working position permitting relative movements between said members in the direction to lengthen the device and restraining relative movements tending to shorten the device, said retainer in its idle position leaving said members free to move relatively to each other for both shortening and lengthening the device, a spring carried on and within said second member in position to engage either of two areas on the retainer, depending on which of its said positions the retainer occupies, yieldingly to hold the latter in that position, and two abutments in, and in spaced relation lengthwise of, the tubular member, one abutment being in position to engage the retainer and shift it into its working position when the device is shortened to a predetermined extent, and the second abutment being in position to engage said pusher and drive it in the direction to shift the retainer into its idle position when said members are moved to a maximum distance relatively to each other in the direction to lengthen the device.

2. An extensible device comprising a tubular member, a second tubular member fitting slidably in and projecting from the upper end of the first member, a cylindrical block secured in the inner end of said second member, said second member containing a slot extending a short distance up through the inner end, a retainer pivotally mounted in said block for swinging movements about an axis at one end, which is the heel end, and which said axis is transverse to the longitudinal axis of the device, said retainer being long enough to permit its free end to project through said slot, the retainer having at the heel two areas at an angle to each other, a spring in the block adapted for engagement with either of said areas to hold the retainer yieldingly in either of two positions one of which is a working position in which it contacts the wall of the first tubular member and the other of which is an idle position in which it stands clear of such wall, a loose pusher device in said slot above the retainer, stationary abutments in the upper and lower ends of the first tubular member in alignment with and, respectively, above and below the retainer, the second tubular member having a longitudinal, peripheral groove registering with said slot, and the upper abutment extending into said groove and engaging the pusher when the second member is raised to a predetermined height.

3. A device as set forth in claim 2, wherein the first tubular member contains openings through its wall, wherein one of the abutments is a bar resting loosely in one of said openings, wherein a yielding friction device is mounted in the other opening and bears on the periphery of the second of said members, and wherein a movable sleeve surrounds the first member to cover said openings and hold the bar and the friction device in place.

4. An extensible device comprising a tubular member, a second member fitting slidably in and protruding at one end from the first member, said second member having a tubular inner end provided with a short longitudinal slot, a cylindrical block secured in said inner end, a retainer pivoted within said second member for rocking movements through said slot between an idle position clear of the first member and a working position in which it engages the latter member, a spring mounted in the block adjacent to the retainer, said retainer having thereon two areas one of which is adapted to be pressure-actuated by the spring when the retainer is in the idle position while the other is adapted to be pressure-actuated by the spring when the retainer is in the working position, the spring yieldingly holding the retainer in either of the said positions into which it may be brought, the retainer being shaped to jam against the first member when a force is applied to move said members in one direction, relatively to each other, while the retainer is in its working position, and to ride freely along the first member under forces tending to move said members relatively to each other in the opposite direction, the second member containing an external longitudinal groove aligned with said slot, and abutments in the first member in positions to cause the retainer to reverse its position at the respective limits of the relative movements between said members; one of the abutments riding in said groove.

5. A device as set forth in claim 4, wherein the cylindrical block contains a longitudinal peripheral groove in the same plane as the retainer, and wherein there is a loose pusher bar in the latter groove and bearing at one end against the retainer, and wherein the pusher bar has a part that protrudes into the path of the abutment that rides in the external groove in said second member.

6. A device as set forth in claim 4, wherein the cylindrical block contains a longitudinal, peripheral groove in the same plane as the retainer, and wherein there is a pusher bar held in the groove in the cylindrical block by the surrounding outer tubular member, one end of the bar being adapted to engage the retainer and having a part projecting into the slot in said second member far enough to lie in the path of the abutment which is entered in the external groove in said second member, and wherein the second end of the pusher bar has a part that overlaps the inner end face of said cylindrical block and engages the same by the time it has forced the retainer into its idle position.

7. A combination as set forth in claim 4, wherein the tubular member contains an opening within which the second abutment is seated, together with a sleeve-like element surrounding the latter member at and closing the said opening.

8. An extensible device comprising a tubular member and a second member fitting slidably in and protruding at one end from the latter; a retainer at the inner end of said second member and pivoted thereto for swinging movements between a working position, in frictional contact with the inner surface of the tubular member, and an idle position, away from such surface; the retainer being shaped to cooperate with said surface, when engaged therewith, to permit relative lengthwise movements in the direction to lengthen the device, while preventing relative movements in the opposite direction; a spring mounted on said second member adjacent to the retainer, and the retainer having thereon two areas positioned to be engaged alternately by the spring as the retainer is shifted from one of its positions to the other, so as yieldingly to hold the retainer in either position into which it may be brought; and stationary abutments in and spaced lengthwise of the tubular member to cooperate with the retainer to shift the latter into its idle position when the device is elongated to a predetermined extent and to shift it into the working position when said members are moved relatively to each other to shorten the device to a predetermined length.

9. An extensible device as set forth in claim 8, wherein the second member is in the form of a tube, the retainer and the spring are both arranged within that tube, and the latter is provided with a slot through which the retainer swings.

10. An extensible device as set forth in claim 8, wherein the retainer comes into direct contact with both abutments.

11. An extensible device as set forth in claim 8, wherein there is movably mounted on the second member a pusher element movable lengthwise of that member, adapted for contacting the retainer and positioned to engage one of the abutments at one limit of the relative movements of that member and the tubular member.

References Cited in the file of this patent

UNITED STATES PATENTS

| | | |
|---|---|---|
| 1,447,519 | Schade | Mar. 6, 1923 |
| 2,229,512 | Lustig | Jan. 21, 1941 |
| 2,396,022 | Schmidt | Mar. 5, 1946 |
| 2,643,922 | Rudman | June 30, 1953 |

FOREIGN PATENTS

| | | |
|---|---|---|
| 253,439 | Switzerland | Feb. 16, 1949 |